May 13, 1958 D. L. TARALDSEN 2,834,631
TRAILER FOR HAULING AUTOMOBILES AND OTHER CARGO
Filed April 6, 1956
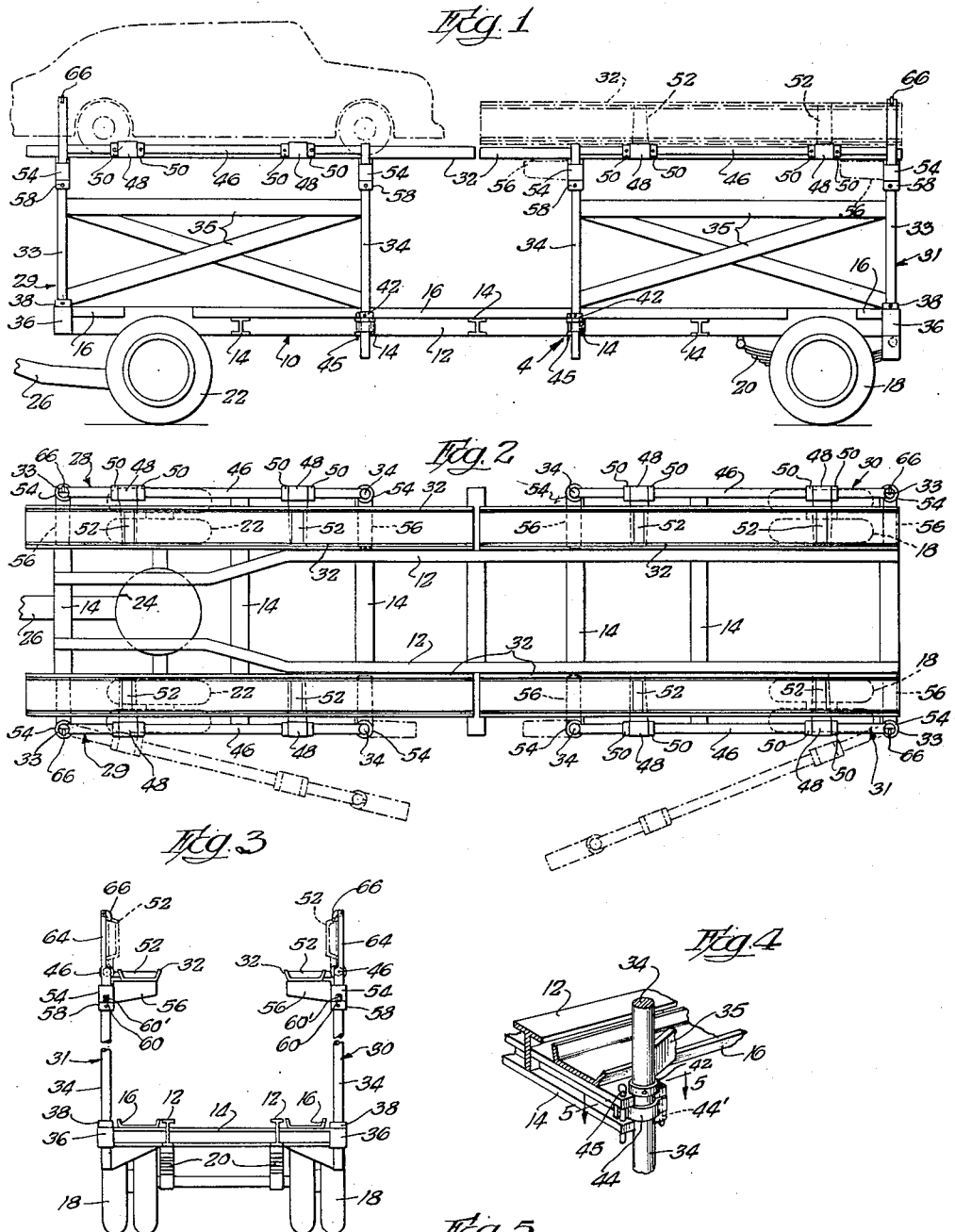
INVENTOR.
DAVID L. TARALDSEN
BY
ATTORNEY United States Patent Office 2,834,631
Patented May 13, 1958

2,834,631

TRAILER FOR HAULING AUTOMOBILES AND OTHER CARGO

David L. Taraldsen, Burbank, Calif.

Application April 6, 1956, Serial No. 576,569

2 Claims. (Cl. 296—1)

This invention relates generally to truck trailers of the type employed for transporting automobiles from a point of manufacture to a sales location and particularly to an improved truck trailer of the above character which is designed to accommodate the hauling of automobiles or other cargo.

Existing truck trailers for transporting automobiles are specially designed for that purpose and embody, generally, a main frame, or bed, mounting a pair of parallel, generally U-section channels for receiving the wheels of a lower row of automobiles. Fixed to opposite sides of the main frame are upstanding side frames which mount an elevated pair of parallel channels for receiving the wheels of an upper row of automobiles.

These existing automobile trailers are deficient from the point of view that they are capable of hauling a payload only in one direction. That is, the automobiles which they transport are carried from the point at which they are manufactured or assembled, to the point from which they are distributed to the consumer, and heretofore the trailers, after being unloaded at the last mentioned destination, were returned in empty condition to the point of manufacture or assembly of the automobiles for receiving another payload. It will be apparent, that such transporting of a payload on only the outgoing leg of a particular trip, rather than on both the outgoing and return legs of the trip, is an inefficient and costly practice. Thus, the revenue accruing from the trailer could be substantially increased if the latter carried payloads during both the outgoing and return runs.

Since the occasion to transport automobiles during the return run seldom, if ever, arises, the trailers have necessarily been returned in empty condition owing to the fact that their specialized construction precluded loading them with any cargo other than automotive vehicles. Thus, to be practical as a cargo hauling trailer, for hauling commodities, such as lumber, for example, the trailer must be capable of being loaded from its sides so that loading may be accomplished rapidly and efficiently through the use of fork lift trucks, and the like. Such loading procedures are not possible with existing automobile trailers, however, since the side frames of the trailer, which supported the elevated channels, or tracks, were rigidly bolted or welded to the sides of the main frame or bed.

With the above preliminary remarks in mind, a major object of the present invention is the provision of a truck trailer of the class described which is designed for transporting automobiles as well as other types of cargo, such as lumber and the like.

Another object of the invention is the provision of a truck trailer of the class described whose construction is such as to enable rapid and efficient loading thereof with automobiles or other cargo so that the trailer is adapted to the hauling of payloads on both the outgoing and return runs of a trip.

Still another object of the invention is the provision of a truck trailer of the class described which embodies upstanding side frames mounting elevated channels or tracks for receiving an upper row of automobiles during an outgoing run of a given trip, and which side frames are hingedly mounted on the main frame of the trailer in a manner to permit swinging of the side frames away from the main frame to an open position wherein lumber and other cargo may be rapidly and efficiently loaded on the trailer for transportation on the return run of the trip.

The above and other objects of the invention may be better understood from the following detailed description taken in conjunction with the annexed drawings, wherein:

Fig. 1 is a side elevational view of a trailer embodying the features of this invention;

Fig. 2 is a top plan view of the trailer of Fig. 1;

Fig. 3 is a rear elevational view of the trailer of Fig. 1;

Fig. 4 is an enlarged, perspective view of the area indicated by the arrow 4 in Fig. 1; and Fig. 5 is an enlarged section taken along line 5—5 of Fig. 4.

Referring now to these drawings, the present truck trailer comprises a main frame, or bed, 10 including longitudinally extending I-beams 12 and transversely extending I-beams 14 which are rigidly secured together, as by welding, to form a rigid main frame. As shown, the transverse I-beams 14 extend laterally a distance beyond the longitudinal I-beams 12, and affixed to the laterally extending portions of the beams 14 are longitudinally disposed, upwardly opening U-section channels 16, forming tracks for receiving the wheels of a lower row of automobiles, as will subsequently be more fully explained. The I-beams 14 may extend through suitable cutouts in the lower flanges and webs of the I-beams 12, as shown, and the latter may be secured to the transverse I-beams 14 in any suitable manner, as by welding.

The after end of the main frame 10 is supported on a set of rear wheels 18 through the medium of any conventional spring suspension system, indicated at 20, while the forward end of the main frame is swivelly mounted on a set of front wheels 22, as by any conventional swivel suspension system, generally indicated at 24, so that the front wheels may be turned relative to the main frame for steering of the trailer. A connecting bar 26 is joined to the swivel mount 24 and extends forwardly of the main frame for connection to a truck for hauling the trailer. In this connection, it is pointed out that while the present drawings and descriptions pertain to a trailer to be hauled by a truck, the features of the invention may equally well be incorporated into a construction wherein the frame 10 is an integral part of the truck frame rather than in the form of a separate trailer, as shown.

Indicated at 28, 29, 30, and 31 are side frames which mount, in a manner to be presently described, horizontal, elevated channels 32 for supporting the wheels of an upper row of automobiles. These side frames each comprise a pair of tubular upstanding posts 33 and 34 which are rigidly joined by reinforcing frame members 35, the cross sectional dimensions of the posts and reinforcing members being such that the side frames will possess sufficient rigidity and strength to support the weight of the upper row of automobiles to be carried thereby.

The side frames 28 to 31 are hingedly mounted on the main frame 10 for outward pivotal movement of the side frames, as indicated by phantom lines in Fig. 2. The pivotal mounting for the side frames comprises hollow, cylindrical sleeves 36 welded, or otherwise firmly secured, to the outer ends of the forward and after ones of the transverse I-beams 14 on the main frame 10. The sleeves 36 are disposed with their axes vertical and have the lower extremities of the side frame posts 33 rotatably received therein. Firmly fixed on the posts 33, and having their lower end faces slidably bearing on the upper end faces of the sleeves 36 are cylindrical collars 38 for restraining the posts 33 against downward axial movement in the sleeves 36. By virtue of the rotatable mounting of the posts 33 in the sleeves 36, the side frames 28—31 may be hinged outwardly from their solid line closed positions to open positions to permit loading of lumber or other commodities through the side of the trailer.

In the solid line closed positions of the side frames, the lower extremities of the side frame posts 34 are received in arcuate notches 40 (Fig. 5) formed in the outer ends of intermediate ones of the transverse I-beams 14 on the main frame. Collars 42, rigidly fixed on the posts 34, have their lower end faces bearing on the upper surfaces of these latter I-beams in the closed positions of the side frames to support the ends of the latter in a vertical direction. Releasable fastening means, each comprising an arcuate strap 44 pivotally mounted at 44' on the I-beams, extend over the posts 34, in the closed positions of the side frames, to retain the posts 34 in the arcuate notches 40. Removable pins 45 releasably hold the straps 44 in their latching positions.

Rigidly attached at opposite ends to the posts 33 and 34 of each side frame, adjacent the upper ends of the posts, are horizontal supporting rods 46 having rotatably mounted thereon, at spaced points therealong, pairs of sleeves 48 which are restrained against axial movement on the supporting rods 46 by collars 50 fixed to the rods. The sleeves 48 rigidly mount radial supporting arms 52 which extend through the flanges of and are welded to the respective elevated channels 32 so that the latter are mounted on the supporting rods 46 for pivotal movement about horizontal axes from horizontal positions, shown in solid lines in Figs. 1 and 3, to the phantom line vertical positions shown in these figures.

In the horizontal positions of the channel members 32, they form, as previously described, tracks for supporting an upper row of automobiles. To support the channel members 32 in their horizontal positions, there are provided on each side frame pairs of hinged brackets comprising sleeves 54 rotatably mounted on the upright supporting posts 33 and 34 directly below the channels 32 and rigidly mounting radial supporting arms 56. The sleeves 54 are retained against downward axial movement on the supporting posts 33 and 34 by means of collars 58 on the posts against the upper surfaces of which the lower end faces of the sleeves 54 bear. The supporting brackets 54, 56 may be swiveled on the posts 33 and 34 to accommodate their pivotal movement to the phantom line positions, indicated in Fig. 1, when the channel members 32 are elevated to their aforementioned vertical positions. Projections 60 on the collars 58, adapted to fit into notches 60' in the sleeves 54 serve to retain said brackets in either their solid line or dotted line positions. To this end the brackets are capable of limited upward movement along the posts, when the channels 32 are elevated to their dotted line positions, to permit disengagement of the projections from the notches.

The upper ends of the supporting posts 33 are cut off and the upper ends of posts 34 are narrowed, as indicated at 64 in Fig. 3, to provide the necessary clearance for the flanges of the upper channels 32 when the latter are hinged to their vertical positions. The upper ends of these narrowed portions 64 of the posts mount catches 66 for releasably retaining the upper channels 32 in their phantom line, elevated positions.

In use of the present trailer for transporting automobiles, the side frames will be fixed in their solid line closed positions, by the fastening means 44, and the channels 32 will be supported in their horizontal positions on the brackets 54, 56. The automobiles will be loaded onto the trailer by employing, in the well known manner, inclined ramps, not shown, over which the automobiles may be driven onto the lower channels 16 and onto the upper channels 32. An automobile, when loaded on the upper channels, may occupy, for example, the position indicated in phantom lines in Fig. 1.

After the automobiles have been unloaded from the trailer, at the termination of an outgoing run of a trip, the upper channels 32 are hinged to their vertical positions, and latched in such positions by the catches 66, and the upper supporting brackets 54, 56 are swung to their phantom line retracted positions, shown in Fig. 1. The releasable fastening means 44 are now disengaged from the supporting posts 34 to permit outward swinging of the side frames 28—31 to their open positions wherein, by means of a fork lift truck, for example, a load of lumber or other commodities may be loaded on the trailer bed. To permit a payload of lumber and the like to be carried on the main frame or bed 10 of the trailer, the latter may have placed on top thereof a suitable platform or transverse supporting elements such as 4 x 4's, not shown, on top of which the lumber or other commodities would be loaded. After loading of the trailer has been accomplished, the side frames are again latched in their closed positions alongside the main frame so as to retain the cargo in position on the trailer bed. The vertical positioning of the upper channels 32 and disposition of the brackets 54, 56 in the planes of their respective side frames accommodates the loading of the trailer to the height of the side frames.

It should be understood that in practice, additional structural reinforcing members and arrangements of the reinforcing members other than that disclosed herein may be employed to provide a trailer construction which is capable of supporting a load of automobiles and other cargo. The relative sizes and arrangement of the structural members, shown in the drawing, are illustrative in nature only and no attempt has been made to disclose a trailer construction which is based on an actual engineering design and stress analyses involving the loads normally carried by such trailers. Moreover, the construction of the hinged side frames may vary with the type of alternative load the trailer is to carry. Thus, for example, the side frames may be appropriately constructed to accommodate the transporting of livestock.

Accordingly, while a present preferred embodiment of the invention has been described and illustrated, it will be apparent that numerous modifications in design and arrangement of parts is possible within the scope of the following claims.

I claim:

1. In a vehicle for transporting automobiles and other cargo, a main frame having forward and after ends; wheels on said frame for movably supporting the latter on the ground; a pair of upwardly opening, longitudinally extending, generally U-section channels fixed to the main farme and forming tracks laterally spaced to receive the wheels of a lower row of automobiles; a pair of vertical side frames at each side of the main frame; one side frame of each pair of side frames being located adjacent the forward end of the main frame and each having a vertical forward edge, the other side frame of each pair of side frames being located adjacent the rear end of the main frame and each having a vertical rear edge; means hinging the forward side frames to the main frame for swinging about vertical axes lying along said forward edges of the forward side frames; means hinging the rear side frames to the main frame for swinging about vertical axes lying along said rear edges of the rear side frames; said side frames being swingable between closed positions against the sides of the main frame and open positions away from the sides of the main frame to accommodate the loading of cargo onto the main frame from the sides of the latter; an upper, horizontal, generally U-section channel fixed to each side frame a distance above the main frame, said upper channels of each pair of side frames being longitudinally aligned and said upper channels of the pairs of side frames forming upper tracks laterally spaced to receive the wheels of an upper row of automobiles in the closed positions of the side frames; the opposing ends of the upper channels of each pair of side frames being lonigtudinally spaced sufficiently to accommodate outward swinging of the side frames and their respective upper channels; cooperating vertical support means on the main frame and side frames for vertically supporting the free ends of the side frames against downward deflection under the weight of automobiles supported in said upper tracks when the side frames are in said closed positions; and releaseable latch means for latching said side frames in said closed positions.

2. The subject matter of claim 1 wherein said side frames each comprise a vertical post at said free end thereof; said cooperating vertical support means comprising a series of laterally extending frame members on the main frame, each frame member being associated with a respective one of said side frames and formed with a recess for receiving the lower end of said vertical post of its associated side frame when the latter is in closed position, and a collar on the lower end of each post for abutting the upper side of the adjacent frame member when the side frames are in closed position.

References Cited in the file of this patent
UNITED STATES PATENTS

| | | |
|---|---|---|
| 1,634,778 | Gregg | July 5, 1927 |
| 1,865,569 | Judd | July 5, 1932 |
| 2,146,567 | Dondlinger | Feb. 7, 1939 |
| 2,636,772 | Bridge | Apr. 28, 1953 |